United States Patent
Thorburn et al.

(10) Patent No.: US 8,472,156 B2
(45) Date of Patent: Jun. 25, 2013

(54) METHOD AND DEVICE FOR SUPERVISING THE SENSITIVITY OF A PROTECTION FUNCTION

(75) Inventors: Stefan Thorburn, Vasteras (SE); Henrik Johansson, Vasteras (SE); Stefan Roxenborg, Vasteras (SE); Tord Bengtsson, Vasteras (SE)

(73) Assignee: ABB Research Ltd. (CH)

( * ) Notice: Subject to any disclaimer, the term of this patent is extended or adjusted under 35 U.S.C. 154(b) by 86 days.

(21) Appl. No.: 13/280,128

(22) Filed: Oct. 24, 2011

(65) Prior Publication Data

US 2012/0099233 A1    Apr. 26, 2012

Related U.S. Application Data

(63) Continuation of application No. PCT/EP2009/054971, filed on Apr. 24, 2009.

(51) Int. Cl.
*H02H 3/00* (2006.01)

(52) U.S. Cl.
USPC .......................................................... 361/78

(58) Field of Classification Search
USPC ................ 361/62, 78; 702/104, 116, 181
See application file for complete search history.

(56) References Cited

U.S. PATENT DOCUMENTS

| | | | |
|---|---|---|---|
| 3,558,986 A | | 1/1971 | Schleif et al. |
| 4,333,050 A | * | 6/1982 | Yeasting ........................ 324/107 |
| 4,532,568 A | | 7/1985 | Kraus, Sr. |
| 8,149,554 B2 | * | 4/2012 | Pietrzyk et al. ................. 361/78 |
| 8,184,417 B2 | * | 5/2012 | Pietrzyk et al. ................. 361/88 |
| 2009/0160477 A1 | * | 6/2009 | Agarwal et al. ............... 324/766 |
| 2010/0211342 A1 | * | 8/2010 | Blessing ........................ 702/64 |

FOREIGN PATENT DOCUMENTS

| | | |
|---|---|---|
| EP | 2012402 A2 | 1/2009 |
| JP | 11355953 A | 12/1999 |
| WO | 0039715 A2 | 7/2000 |

OTHER PUBLICATIONS

International Search Report and Written Opinion of the International Searching Authority; Application No. PCT/EP2009/054971; Issued: Dec. 14, 2009; Date Mailed: Dec. 21, 2009; 14 pages.

* cited by examiner

*Primary Examiner* — Rexford Barnie
*Assistant Examiner* — Christopher Clark
(74) *Attorney, Agent, or Firm* — St. Onge Steward Johnston & Reens LLC

(57) ABSTRACT

A method and a device for supervising the sensitivity of a protection function in an electrical power system including a metering device for measuring values of a feature, said protection function being configured to initialize an action based on a test value and a threshold value for the feature, wherein said test value is either a measured value or derived from the said measured values, the device includes a computing unit configured to receive the test values and, repeatedly during the operation of the protection function, to calculate a mean value and a deviation of the test values, to determine the probability of a false action based on the calculated mean value, the threshold value and the calculated deviation, and to indicate that the sensitivity is too high when the probability of a false action exceeds a first limit value for the probability of a false action.

13 Claims, 5 Drawing Sheets

METHOD AND DEVICE FOR SUPERVISING THE SENSITIVITY OF A PROTECTION FUNCTION

CROSS-REFERENCE TO RELATED APPLICATIONS

The present application is a continuation of pending International patent application PCT/EP2009/054971 filed on Apr. 24, 2009 which designates the United States and the content of which is incorporated herein by reference.

FIELD OF THE INVENTION

The present invention relates to a method and a device for supervising the sensitivity of a protection function used in an electrical power system such as an electrical power generation system, for example, a nuclear power system or an electrical transmission and distribution system. The invention is applicable to a digital relay device in which the protection function is installed for protecting other devices in the electrical power system. The protection function may, for example, be a differential protection function, an overcurrent protection function, a distance protection function, or a directional comparison protection function.

BACKGROUND OF THE INVENTION

A typical protection function is based on a test value which is either a measured value such as a current or voltage value or a value derived from the analysis of a number of measured values. The test value could also be a non-electrical quantity such as a temperature or vibration amplitude. To determine if an action or no action is to be taken, the test value is compared to a threshold value. If the test value is on the dangerous side of the threshold, an action is taken. For example, a trip signal is initialized to a circuit breaker, which in turn is operated in a way to prevent the other devices in the electrical power system from damage. In simple cases, the threshold is just a fixed value; while in more intricate protection functions, it may be dependent on time and on other measured values. The principle is however the same. The quality or accuracy of the measured value may change due to various factors; for example, in the electrical power system, different voltage levels, current ratings and grounding methods may provide measured values with different accuracy levels.

An improper action based on the measured values may generate an unexpected result. For example, in a case where an action that should be taken in response to a fault is not initialized, damage will be caused, as a consequence, to the devices in the electrical power system. Therefore, protection functions are usually designed for high dependability. A common problem with a protection function possessing high dependability is that the protection function may be too sensitive and insecure, which gives rise to a tendency to take an unwanted action, which may, for example, unnecessarily block electricity production in a nuclear power system to result in an unexpected cost for the user of the system.

Today, by testing the outputs of the protection function, the designer of the protection function, commissioning engineers and customers may set a threshold value. This, however, does not ensure that the threshold is properly set, and, as consequence, an improper threshold value may result in a number of false actions. Furthermore, this approach is time- and cost-consuming due to the variation of test values that are required. Moreover, users have no indication as to under which circumstance a false action will appear until a number of false actions have been observed and the operation of an electrical power system has been disturbed.

Therefore, it is important to be able to reduce the number of false actions in an optimal way to avoid unmotivated disturbances in an electrical power system.

SUMMARY OF THE INVENTION

One object of the present invention is to reduce the number of false actions produced by a protection function.

This object is achieved by a method for supervising the sensitivity of a protection function in an electrical power system comprising a metering device for measuring values of a feature, said protection function being configured to initialize an action based on a test value and a threshold value for the feature, wherein said test value is either a measured value or a value derived from the said measured values.

Such a method comprises calculating a mean value and a deviation of the test values, determining the probability of a false action based on the calculated mean value, the threshold value and the calculated deviation, and indicating that the sensitivity is too high when the probability of a false action exceeds a first limit value for the probability of a false action. The above steps are repeatedly performed during the operation of a protection function.

According to the invention, the sensitivity of the protection function is supervised during the operation of the protection function. The sensitivity is determined by calculating the probability of a false action based on the calculated mean value, the threshold and the calculated deviation. In order to reflect the distribution of test values as well as possible, the test values used for calculating the mean value and deviation cover a period of time longer than the time period of normal variations in the electrical power system.

When the probability of the false action exceeds the first limit value for the probability of a false action, it means that the sensitivity of the protection is too high. In such a case, a range of remedial actions can be taken, from just an indication to preventing the supervised protection function to act.

Due to the fact that the invention is able to supervise the sensitivity of the protection function during its operation, it is possible to detect if the sensitivity of the protection function is too high before any false actions have been produced. Moreover, the invented method offers an opportunity for a user to evaluate the situation, thereon to determine if the threshold value was properly set and eventually to adjust the threshold value. Accordingly, the object of reducing the number of false actions is achieved.

Another advantage is that by indicating when the probability of the false action exceeds the first limit value, the sensitivity of the protection function is made visible for both the designer of the protection function, commissioning engineers and users, which makes the behavior of the protection function more predictable and results in shorter commissioning time.

According to an embodiment of the invention, the probability of a false action is calculated assuming the test values follow a normal distribution. Therefore, it can, for example, be calculated by a cumulative distribution function of a normal distribution of the test values.

According to an embodiment of the invention, the method further comprises indicating that the sensitivity is too low when the probability of a false action is below a second limit value for the probability of the false action. The main object of the invention is to reduce the number of false actions because a protection function is mostly designed for high sensitivity. On the other hand, if the sensitivity of the protection function is too low, it cannot provide protection to devices in an electrical power system. Therefore, damage will be caused to those devices. In this case, an adjustment of the threshold value is needed. The advantage is that this draws operator's attention on the situation where the sensitivity is too low and there may therefore be a risk that an protective action may not be initialized accordingly.

According to an embodiment of the invention, the method further comprises, upon an approval of a user, automatically adjusting the threshold value based on said determined probability of a false action.

Because the invention makes it possible to indicate if the sensitivity of the protection function is too high or too low, an optimal balance between security and dependability is reached. In other words, the sensitivity of the protection function is settled at a proper level. A threshold value may, for example, be a limit value for a trip signal, an alarm, or for other types of settings and parameters for the protection function.

It is advantageous that a threshold value can be optimized since it makes it possible for the protection function to initialize an action accurately and therefore to improve the reliability of the protection function. This means that the protection function only initializes an action when it should, while on the other hand it does not react when it should not.

According to an embodiment of the invention, the threshold value is adjusted so that the sensitivity of the protection function is decreased when the probability of the false action exceeds the first limit value for the probability of the false action. If the threshold is not adjusted, this means that the sensitivity of the protection function is too high and the probability that a false action will be initialized is therefore increased. The advantage with this embodiment is that by adjusting the threshold when the probability of the false action exceeds the first limit value for the probability of the false action, the number of false actions will be reduced.

According to another embodiment of the invention, the threshold value is adjusted so that the sensitivity of the protection function is increased when the probability of the false action is below a second limit value for the probability of the false action. Otherwise, when the probability of the false action is below a second limit value for the probability of the false action, the sensitivity of the protection function is too low and the probability for an expected action to be initialized is therefore decreased. It is advantageous that the threshold value is adjusted so that the sensitivity of the protection function is increased when the probability of the false action is below a second limit value for the probability of the false action since this ensures that the protection function always initializes an action when it should.

According to an embodiment of the invention, the threshold value is determined as a sum of the calculated mean value and a number multiplying the calculated deviation. The number multiplying the deviations can be pre-defined.

According to an embodiment of the invention, the present method is implemented by a computer program product for supervising the sensitivity of a protection function in an electrical power system.

Such a computer program product is directly loadable into the internal memory of a computer and comprises software for performing the method for supervising the sensitivity of a protection function in an electrical power system comprising a metering device for measuring values of a feature, said protection function being configured to initialize an action based on a test value and a threshold value for the feature, wherein said test value is either a measured value or a value derived from the said measured values.

The present method is carried out by a device for supervising the sensitivity of a protection function in an electrical power system comprising a metering device for measuring values of a feature, said protection function being configured to initialize an action based on a test value and a threshold value for the feature, wherein said test value is either a measured value or derived from the said measured values.

Such a device comprises a computing unit configured to receive the test values and, during the operation of the protection function, repeatedly to calculate a mean value and a deviation of the test values, to determine the probability of a false action based on the calculated mean value, the threshold and the deviation, indicate that the sensitivity is too high when the probability of a false action exceeds a first limit value for the probability of the false action or that the sensitivity is too low when the probability of a false action is below a second limit value for the probability of the false action, and, upon the approval of a user, automatically adjust said threshold value based on said determined probability of a false action.

The device, according to the invention, may be used in a digital protective relay, wherein the relay device comprises a protection function for protecting other devices in an electrical power system when a fault is detected and the invented device for supervising the sensitivity of the protection function. They together provide a reliable protection to other devices in an electrical power system. Nevertheless, the invention may be integrated into the protection function so that the protection function itself provides information about how sensitive it is and provides a possibility to enable the threshold value to be adjusted, in addition to performing its traditional duty.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1A:
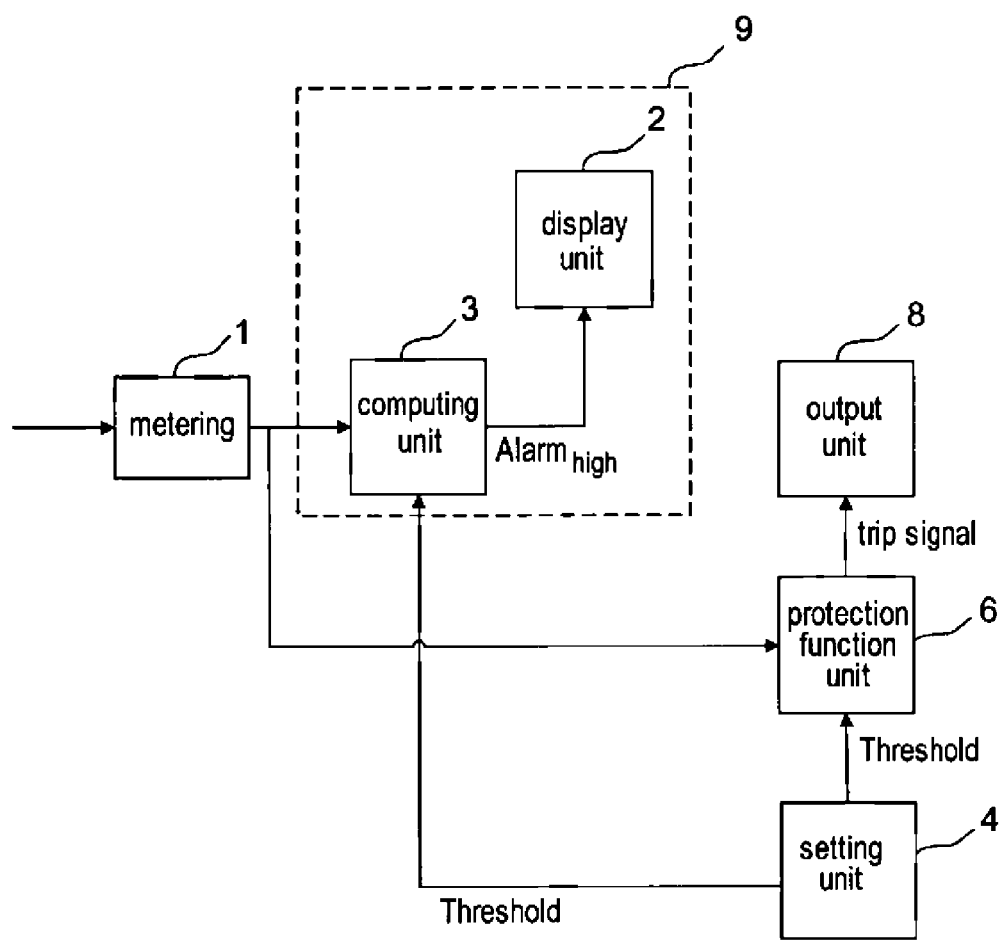
FIG. 1a is a block diagram of an invented device for supervising the sensitivity of a protection function, according to a first embodiment of the invention.

FIG. 1a is a block diagram of an invented device 9 for supervising the sensitivity of a protection function, according to a first embodiment of the invention. The metering unit 1 is arranged for measuring values of a feature, which may, for example, be voltage or current. The metering unit 1 may, for example, be a secondary transformer arranged to measure current or voltage in an electrical power system. The measured values are sent to the protection function unit 6. The protection function unit 6 is arranged, upon receiving the measured value, to calculate a test value based on the measured values, to compare the calculated test value with a threshold value Threshold retrieved from the setting unit 4, and to initialize an action based on the comparison result. Such an action may be communicated to the output unit 8, for example, whereupon a trip signal is generated and sent to the output unit 8. Depending on the protection function, a measured value may be used directly as a test value as shown in this embodiment. The device 9 comprises a computing unit 3 configured to received measured values output from a metering unit 1. In the case where test values are derived from the measured values and calculated by the protection function unit 6, the test values may be communicated to the computing unit 3 from the protection unit 6. Based on the test values, the computing unit 3 is configured to calculate a mean and a deviation, then based on the calculated mean, deviation and a threshold value Threshold, to calculate the probability of a false action, to compare the calculated probability of a false action with a first limit value for the probability of a false value in order to determine if the probability of a false action exceeds the first limit value, to eventually indicate by an alarm signal $Alarm_{high}$ when the sensitivity is too high. In this embodiment, the device 9 also comprises a display unit 2 arranged to indicate when the probability of a false action exceeds the first limit value and to notify an operator that the sensitivity of the protection function is too high. However, there may be other ways to do so, for example, to send the alarm signal $Alarm_{high}$ to another computer having a display unit. The computing unit 3 may, for example, be a microcomputing processor, a digital signal processor, a field-programmable gate array, or a standard computer.

Figure 1B:
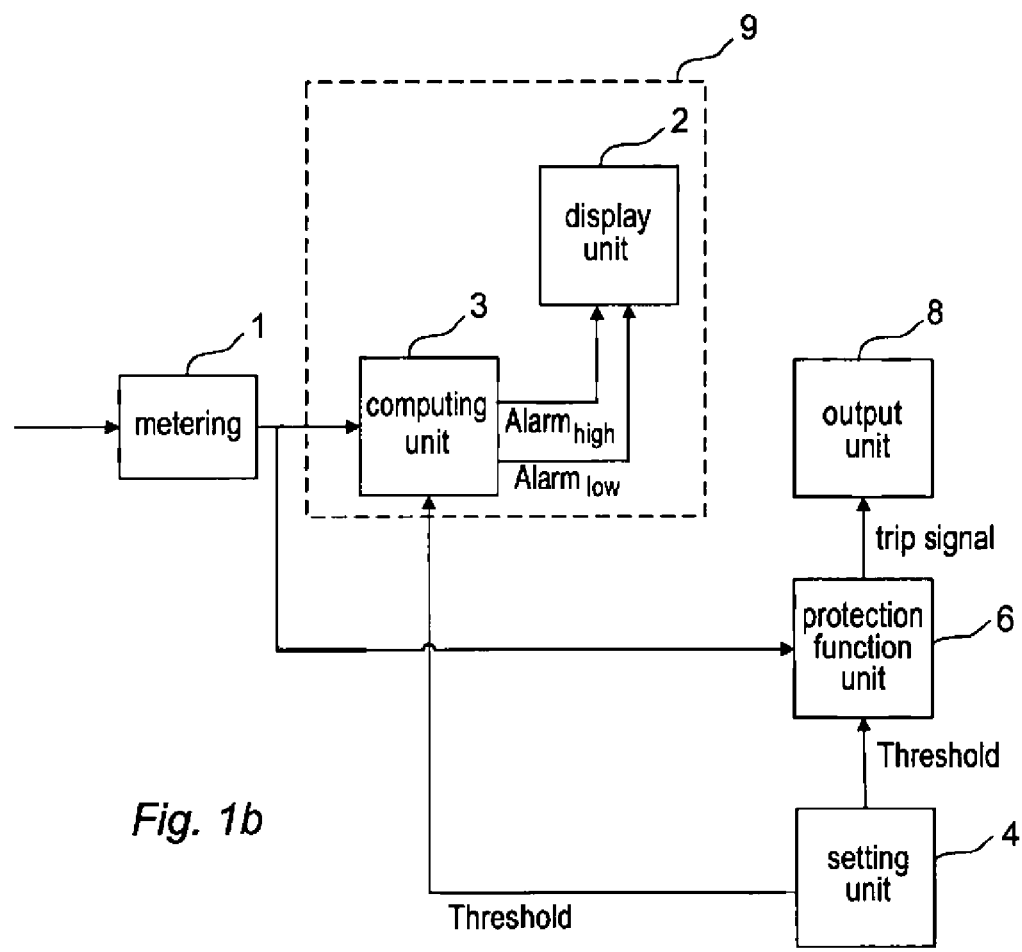
FIG. 1b is block diagram of an invented device for supervising the sensitivity of a protection function, according to a second embodiment of the invention.

FIG. 1b is block diagram of an invented device for supervising the sensitivity of a protection function, according to a second embodiment of the invention. Each component in this example has the same function as the first embodiment, except that the computing unit 3, in this embodiment, further determines if the sensitivity of the protection function is too low. If the sensitivity is too low, it indicates an alarm signal $Alarm_{low}$ on the display unit 2.

Figure 2:
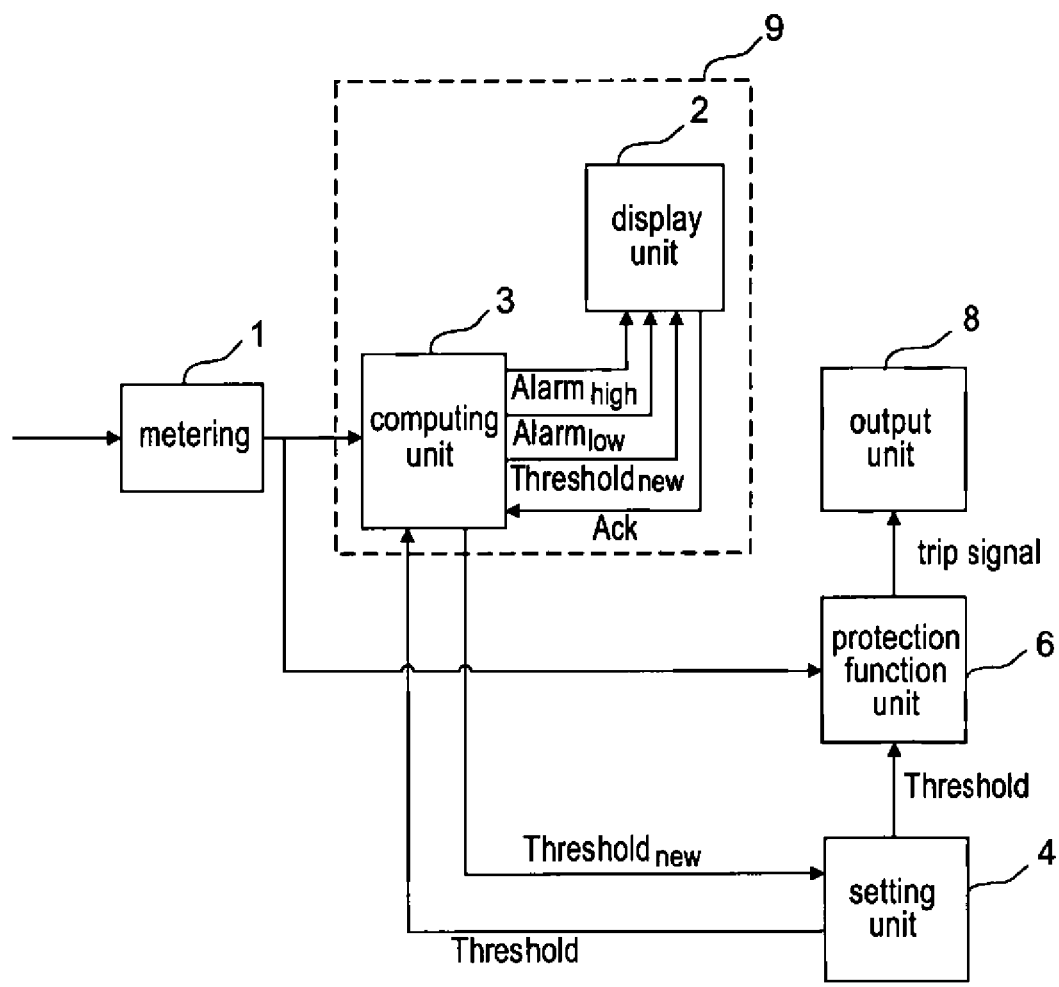
FIG. 2 shows a block diagram of a device for supervising the sensitivity of a protection function, according to a third embodiment of the invention.

FIG. 2 shows a block diagram of a device for supervising the sensitivity of a protection function, according to a third embodiment of the invention. In this embodiment, the computing unit 3 is further configured to calculate a new threshold value $Threshold_{new}$ in a case if the sensitivity of the protection function is either too high or too low. This new threshold value $Threshold_{new}$ is sent to the display unit 2 for an acknowledgement. Upon an approval Ack of a user, this new threshold value will further be sent to the setting unit to replace the threshold value Threshold. In this embodiment, both cases where the higher and lower sensitivity of the protection function are examined, it is possible that the computing unit may be arranged for only determining if the sensitivity of the protection is too high or if the sensitivity of the protection is too low.

In all the above three embodiments, the protection function unit 6 is configured to perform its traditional duty. This means it calculates a test value based on received measured values, compares the test value with a pre-arranged threshold value, performs a protective function and initializes the appropriate control action depending on the result of executing protective function. However, it is understood that the computing unit may be integrated into the protection function unit when it is used in a digital relay protective device.

Figure 3:
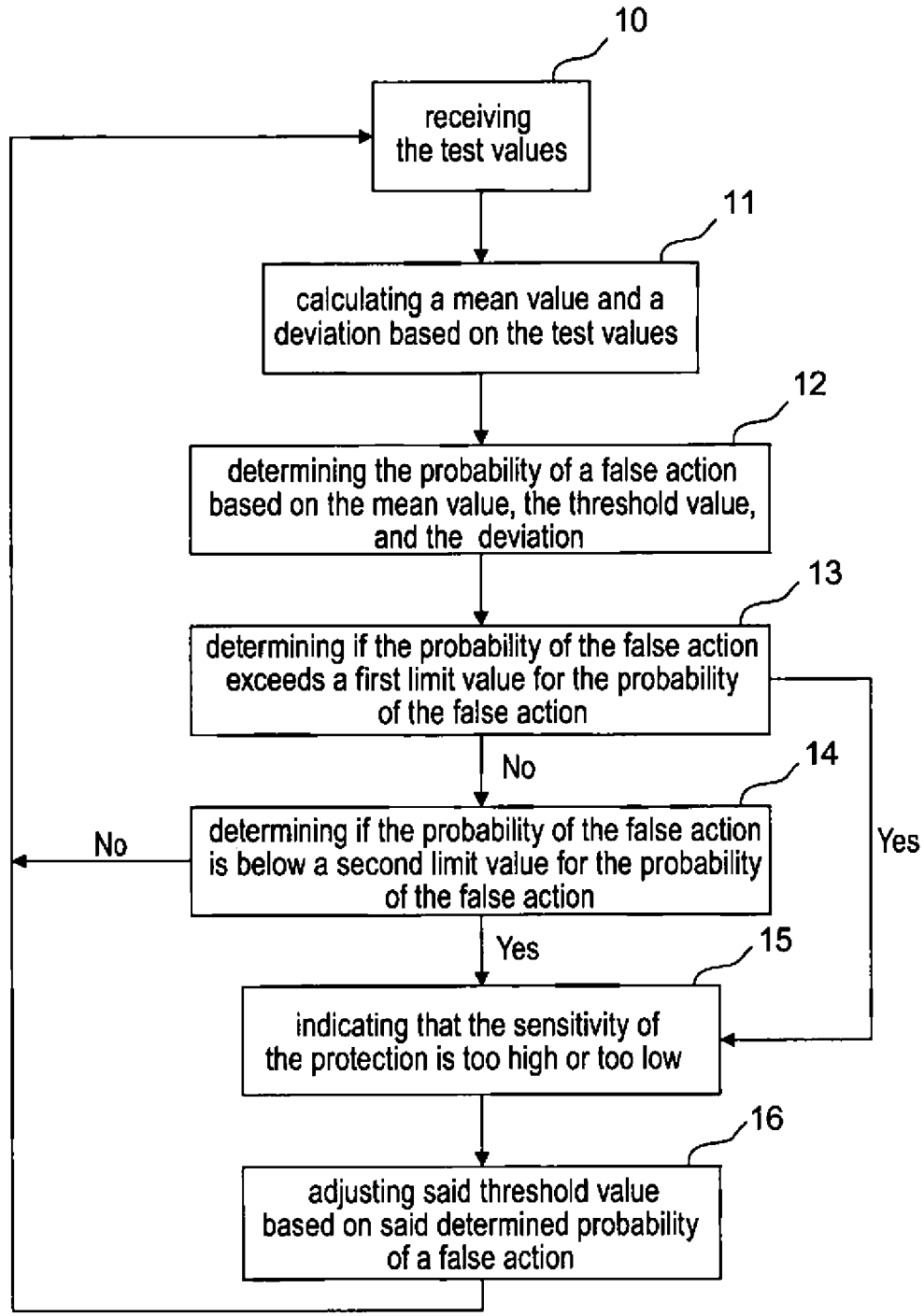
FIG. 3 is a flow chart illustration of the invented method for supervising the sensitivity of a protection function, according to an embodiment of the invention.

FIG. 3 is a flow chart illustration of the invented method for supervising the sensitivity of a protection function that is configured to initialize an action based on a test value and a threshold value for a feature, according to an embodiment of the invention. It will be understood that each block in the flow chart can be implemented by computer program instructions.

The method starts by receiving the test values calculated by the protection function, block 10. Depending on the functionality of the protection function, a test value is either a measured value or a value derived from a number of measured values.

The next step is to calculate a mean and a deviation of the test values, block 11. These can be calculated in a number of ways depending on the nature of the test values and the computing capabilities. The mean can, for example, be calculated as an arithmetic mean value or a median and the deviation as the largest observed variation from the mean or a standard deviation.

Whatever the method used for calculating mean and deviation and the origin of the test value, there is a general observation that the distribution of test values can very often quite accurately be described by a normal distribution:

$$\varphi(x) = \frac{1}{\sqrt{2\pi}} e^{-x^2/2}$$

The function $\varphi(x)$ describes a normal distribution of the test value x with mean value 0 and standard deviation 1. The distribution for an mean value $\mu$ and standard deviation $\sigma$ is given by $$\varphi\left(\frac{x-\mu}{\sigma}\right).$$

If the test value distribution is similar to a normal distribution, the calculated mean and deviation are related to the mean value $\mu$ and standard deviation $\sigma$ in a defined way. This means that the normal distribution will be helpful in selecting the first and second limit values.

The principle of accurately calculating the means and deviation is to reflect the distribution of test values as closely as possible. The test values for calculating the mean value and deviation should cover a period of time longer than the time period of normal variations in the electrical power system. Dependent both on the type of electric power system and the specific protection function, the required time periods may range from minutes to weeks. A protection function for a machine in constant and steady operation will observe all occurring variations in a short time, while the power supply to a community will vary during a day and be different during weekends.

The calculation of the mean value and deviation may also be used to follow a season pattern of a time period, for example, a summer or a winter pattern, because during different seasons, the measured values may vary due to different electricity consuming patterns.

Based on the calculated mean and deviation, and the threshold value, the probability of a false action is determined, block 12. The probability of the false action gives an indication if the sensitivity of the protection function is properly selected, or if it is too high or too low.

From the normal distribution, the probability that x exceeds $\mu$ a specific number of standard deviations y is, by a cumulative distribution function of a normal distribution of the test values, estimated as $$P(y) = \int_y^\infty \varphi(x)dx$$

Figure 4A:
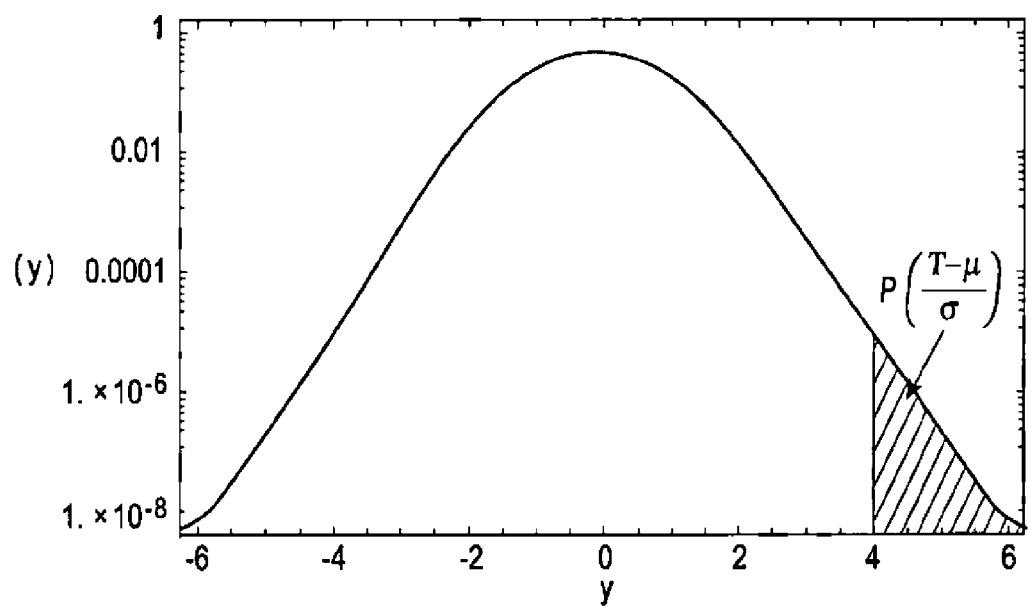
FIG. 4a illustrates an example of a calculation of the probability of a false action.

The probability of a false action is then estimated as $$P\left(\frac{T-\mu}{\sigma}\right),$$

where T is the threshold value, μ the mean and σ the deviation, properly corrected to correspond to a standard deviation. FIG. 4a shows an example of a calculation of the probability of a false action based on a threshold value, a calculated mean and deviation value. In the figure, the calculated probability is the marked area. This probability can then be compared to the accepted limit, $P_a$, or the first limit value, which can be related to an accepted number of standard deviations $y_a$ by $$P(y_a)=P_a$$

Figure 4B:
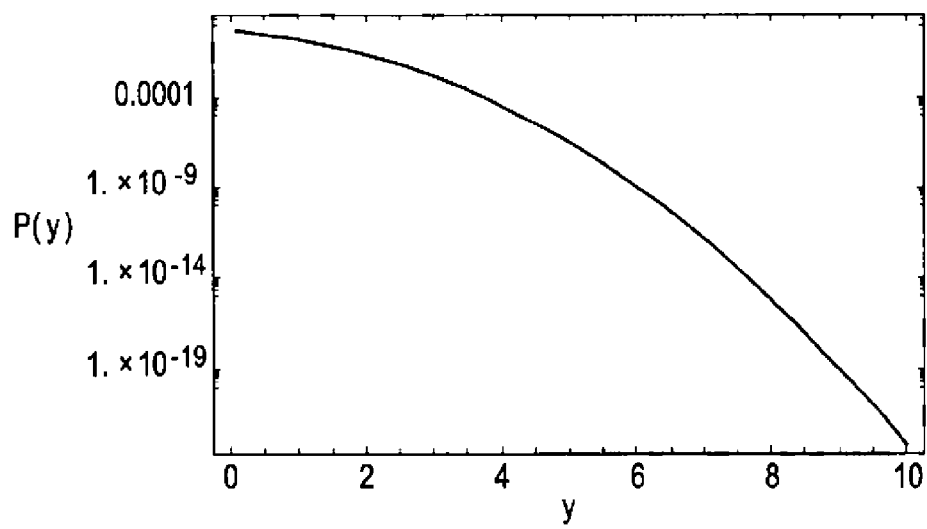
FIG. 4b illustrates an example of an exceeding probability.

The value $y_a$ can be found from $P_a$ for example by the help of FIG. 4b.

Thus, it is required that $$P\left(\frac{T-\mu}{\sigma}\right) \le P_a$$

which is equivalent to $$T \le \mu + y_a \sigma$$

Therefore, the required number of standard deviations $y_a$ is used to reflect the accepted false action probability $P_a$.

As shown in FIG. 4b, the probability P(y) of exceeding 4 standard deviations is about 0.00003 or 30 times out of 1 million. Thus, if the threshold is above the mean plus 4 times the deviation, there will be less than 30 actions initiated for 1 million measurements. If this is not a sufficient security, 6 deviations may be required, for which P(y) is $10^{-9}$, giving a probability of 0.1% for a false action during one year if the measurements are performed each second.

In this way the cumulative distribution function aids the selection of the first and second limit values. The first limit value is set according to the lowest acceptable security that is the maximal number of false actions in a specific time period. The second limit value is set where the security becomes unnecessarily high, for example less than 1 false action in 1 million years, P(y)=$10^{-12}$, y≈7.1, for 1 measurement per second.

In a first case, if the determined probability of the false action exceeds the first limit value for the probability of the false action, an indication is given. For example, an alarm may be issued to indicate that the sensitivity of the protection function is too high and the possibility that a false action will be initialized is high, block 13 and block 15.

In a second case, if the determined probability of the false action is below the second limit value for the probability of the false action, an indication is given to indicate that the sensitivity of the protection function is too low and the sensitivity could be increased, block 14 and block 15.

In either case, the threshold value may be adjusted based on the probability of a false action, block 16. To adjust the threshold, a new threshold value may, for example, be automatically suggested for an operator and, after the approval, the new suggested threshold value may replace the previous threshold value to achieve a proper sensitivity of the protection function.

Considering the measurement rate and an acceptable sensitivity, this gives a minimum number of deviations. Thus, a minimal threshold value can be defined as the observed mean plus the minimal number of deviations needed in order to obtain the required sensitivity. For example, if currents I are used as test values for a protection function, $\bar{I}$ stands for a mean, σ for a standard deviation, n for a minimal number of the standard deviations, then a minimal threshold for the protection function can be determined as $I_{trip}^{min}=\bar{I}+n\sigma$. This means that as long as I follows the same distribution, the probability that $I_{trip}^{min}$ is exceeded is given by P(n), FIG. 4b. It is when I shifts to another distribution with higher values, that a protection function should act.

Although this embodiment examines both cases, it is possible that for another embodiment, only the probability of the false action exceeding the first limit value for the probability of the false action is determined, and for a third embodiment only the probability of the false action being below the second limit value for the probability of the false action is determined.

As shown FIG. 3, the steps 10-16 are repeatedly performed during the operation of the protection function.

A more elaborate example of using the invention is a ground fault protection function which detects ground faults using the measured impedance to ground as test value. Under normal conditions, the impedance to ground has a specific value, which will be reflected in the mean value. Faults are defined as another, parallel, path to ground with some impedance. The sensitivity of this function is defined as the largest fault impedance that can be detected. Thus the sensitivity in the measurement can be estimated as follows.

The detectable fault impedance is the parallel impedance that would change the currently measured impedance n standard deviations, where n is the required reliability of the detection. It can thus be calculated using the mean and the standard deviation of the impedance measurements:

$$\frac{1}{|\bar{Z}|} = \frac{1}{|\bar{Z}| + nS_Z} + \frac{1}{|Z_P|} \text{ or}$$

$$|Z_P| = \frac{1}{\frac{1}{|\bar{Z}|} - \frac{1}{|\bar{Z}|+nS_Z}} = \frac{|\bar{Z}|}{nS_Z}(|\bar{Z}|+nS_z)$$

Where $\bar{Z}$ is the mean calculated impedance, $S_Z$ is the standard deviation of Z and $Z_P$ is the detectable parallel fault impedance.

By calculating the mean value and the standard deviation of impedance with N samples of data, the accuracy for the impedance measurement is obtained. Therefore, when the impedance is used for detecting fault in a protection function, the reliability of the protection function can be determined as well.

What is claimed is:

1. A method for supervising the sensitivity of a protection function in an electrical power system comprising a metering device for measuring values of a feature, said protection function being configured to initialize an action based on a test value and a threshold value for the feature, wherein said test value is either a measured value or a value derived from the said measured values, characterized in that, during the operation of the protection function, the method comprises repeatedly:

calculating a mean value and a deviation of the test values, determining the probability of a false action based on the calculated mean value, the threshold value and the calculated deviation, and indicating that the sensitivity is too high when the probability of a false action exceeds a first limit value for the probability of a false action.

2. The method according to claim 1, wherein the method further comprises indicating that the sensitivity is too low when the probability of a false action is below a second limit value for the probability of the false action.

3. The method according to claim 1, wherein the method further comprises, upon an approval of a user, automatically adjusting said threshold value based on said determined probability of a false action.

4. The method according to claim 3, wherein said threshold value is adjusted so that the sensitivity of the protection function is decreased when the probability of the false action exceeds the first limit value for the probability of the false action.

5. The method according to claim 3, wherein said threshold value is adjusted so that the sensitivity of the protection function is increased when the probability of the false action is below a second limit value for the probability of the false action.

6. The method according to claim 3, wherein said threshold value is determined as a sum of the calculated mean value and a number of the calculated deviations.

7. The method according to claim 1, wherein said probability of a false action is calculated assuming the test values follow a normal distribution.

8. A non-transitory computer program product for supervising the sensitivity of a protection function in an electrical power system, the computer program product is directly loadable into the internal memory of a computer and comprises software for performing the steps of claim 1.

9. A non-transitory computer readable medium, having a program recorded thereon, where the program is to make a computer perform the steps of claim 1, when said program is run on the computer.

10. A device for supervising the sensitivity of a protection function in an electrical power system comprising a metering device for measuring values of a feature, said protection function being configured to initialize an action based on a test value and a threshold value for the feature, wherein said test value is either a measured value or derived from the said measured values, characterized in that the device comprises a computing unit configured to receive the test values and repeatedly during the operation of the protection function, to calculate a mean value and a deviation of the test values, to determine the probability of a false action based on the calculated mean value, the threshold value and the calculated deviation, and to indicate that the sensitivity is too high when the probability of a false action exceeds a first limit value for the probability of a false action.

11. The device according to claim 10, wherein the computing unit is further configured to indicate that the sensitivity is too low when the probability of a false action is below a second limit value for the probability of a false action.

12. The device according to claim 10, wherein the computing unit is further configured, upon an approval of a user, to automatically adjust said threshold value based on said determined probability of a false action.

13. Use of the device according to claim 10 in a digital protective relay device comprising a protection function for detecting faults in an electrical power system for supervising the sensitivity of the protection function.

* * * * *